US008761967B2

(12) United States Patent
Fisher et al.

(10) Patent No.: US 8,761,967 B2
(45) Date of Patent: Jun. 24, 2014

(54) AUTOMATIC CONFIGURATION CONTROL OF A DEVICE

(75) Inventors: Christopher E. Fisher, Simi Valley, CA (US); Marc L. Schmalzel, Simi Valley, CA (US); Steven Chambers, Simi Valley, CA (US); Justin B. McAllister, Simi Valley, CA (US)

(73) Assignee: Aerovironment, Inc., Monrovia, CA (US)

( * ) Notice: Subject to any disclaimer, the term of this patent is extended or adjusted under 35 U.S.C. 154(b) by 0 days.

(21) Appl. No.: 13/478,520

(22) Filed: May 23, 2012

(65) Prior Publication Data

US 2012/0232722 A1  Sep. 13, 2012

Related U.S. Application Data

(63) Continuation of application No. PCT/US2010/058020, filed on Nov. 24, 2010.

(60) Provisional application No. 61/264,587, filed on Nov. 25, 2009.

(51) Int. Cl.
*B64C 37/02* (2006.01)
*G06F 19/00* (2011.01)

(52) U.S. Cl.
USPC .............................. 701/3; 701/120; 244/99.2

(58) Field of Classification Search
USPC ............. 701/3, 10, 120, 528; 340/945; 244/2, 244/46, 99.2
See application file for complete search history.

(56) References Cited

U.S. PATENT DOCUMENTS

| 5,915,649 | A | 6/1999 | Head |
| 6,029,928 | A * | 2/2000 | Kelly ................................ 244/2 |
| 6,199,008 | B1 * | 3/2001 | Aratow et al. ................. 701/120 |
| 7,966,122 | B2 * | 6/2011 | Flynn et al. .................... 701/528 |
| 2001/0028315 | A1 * | 10/2001 | Frantz ............................ 340/945 |
| 2004/0075018 | A1 | 4/2004 | Yamane |
| 2005/0004723 | A1 | 1/2005 | Duggan et al. |
| 2005/0204910 | A1 * | 9/2005 | Padan .......................... 89/1.813 |
| 2006/0058928 | A1 | 3/2006 | Beard et al. |
| 2006/0074558 | A1 * | 4/2006 | Williamson et al. .......... 701/213 |
| 2006/0184292 | A1 | 8/2006 | Appleby et al. |
| 2009/0045296 | A1 | 2/2009 | Cerchie et al. |
| 2009/0090817 | A1 | 4/2009 | Monka |
| 2009/0259350 | A1 | 10/2009 | Morris et al. |

OTHER PUBLICATIONS

International Search Report for Serial No. PCT/US2010/058020 mailed Jan. 31, 2011.

* cited by examiner

*Primary Examiner* — Tan Q Nguyen
(74) *Attorney, Agent, or Firm* — Brooks Acordia IP Law, PC; Eric Aagaard

(57) ABSTRACT

Methods, systems, and devices for determining system/device configuration and setting a mode of operation based on the determined configuration. An air vehicle processor: (a) receives a component information set of at least one external component; (b) determine a mode of operation, by the processor having a current mode of operation setting, based on the received component information and at least one of: an initial mode of operation setting and the current mode of operation setting; (c) determines whether all of the one or more received component information sets match a configuration requirement; (d) transitions to a flight-ready status if the determination is a conjunctive match; and (e) transition to a reset status if the determination is not a conjunctive match.

11 Claims, 9 Drawing Sheets

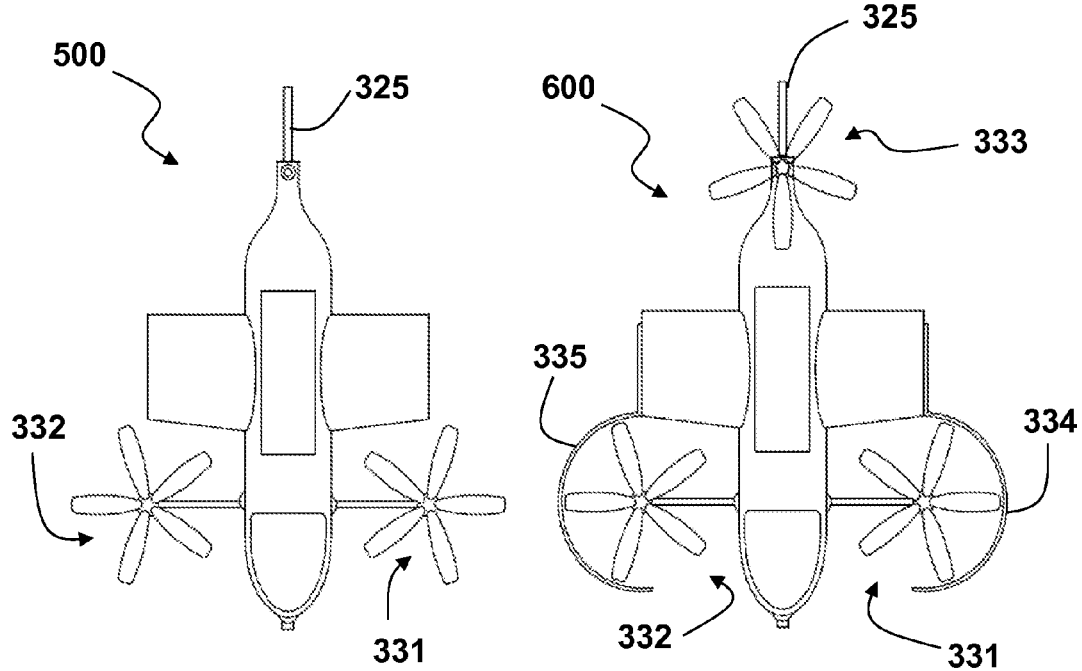
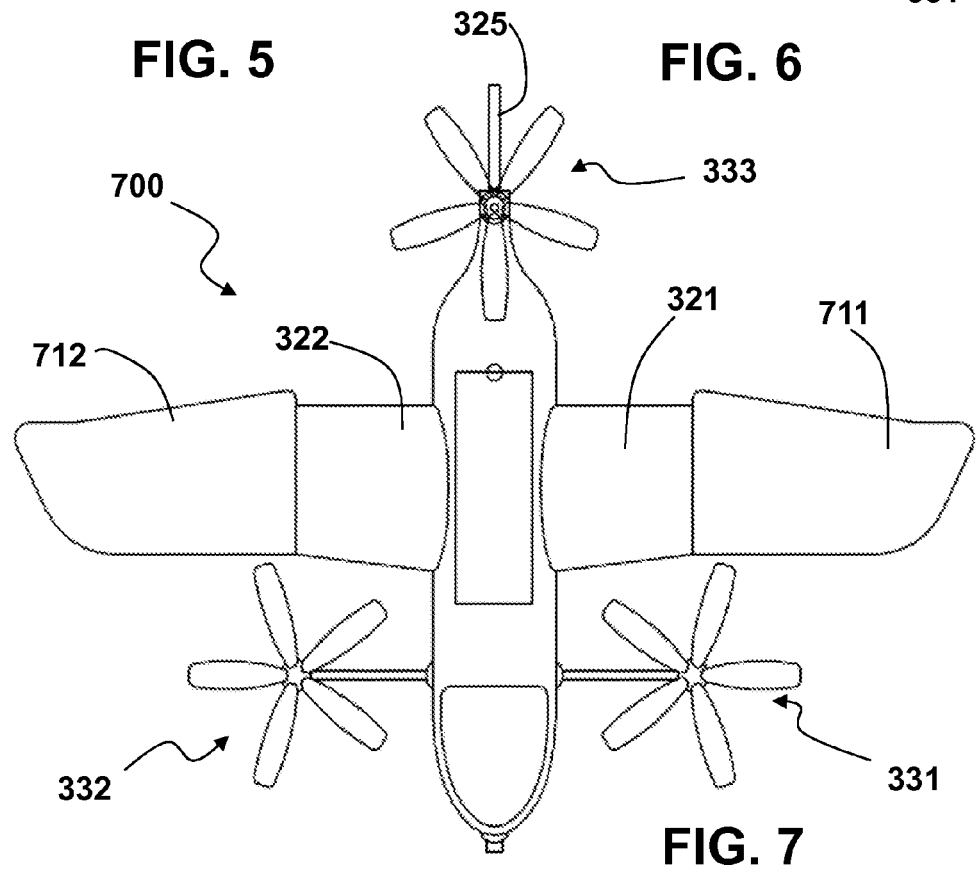

AUTOMATIC CONFIGURATION CONTROL OF A DEVICE

CROSS-REFERENCE TO RELATED APPLICATIONS

This application is a continuation of International Application No. PCT/US2010/058020, filed Nov. 24, 2010, and claims priority to and the benefit of U.S. Provisional Patent Application Ser. No. 61/264,587, filed Nov. 25, 2009, all of which are hereby incorporated herein by reference in their entirety for all purposes.

TECHNICAL FIELD

Embodiments pertain to automatic configuration control of a device and particularly systems and methods of invoking operational modes based on recognized configuration components.

BACKGROUND

Vehicles such as an unmanned aerial vehicle (UAV) may be assembled prior to porting into the field of operation and may be assembled or reassembled in the field of operation.

SUMMARY

Embodiments include methods, systems, and devices for determining system/device configuration and setting a mode of operation based on the determined configuration. For example, an embodiment may include a method of operational mode determination comprising: (a) receiving, by a processing unit, a component information set of at least one external component; and (b) determining a mode of operation, by the processing unit having a current mode of operation setting, based on the received component information set and at least one of: an initial mode of operation setting and the current mode of operation setting. Some embodiments may further comprise: (c) determining whether all of the one or more received component information sets match a configuration requirement; (d) transitioning to a flight-ready status if the determination is a conjunctive match; and (e) transitioning to a reset status if the determination is not a conjunctive match.

Some exemplary embodiments may include a computing device comprising a processing unit and addressable member; the processing unit configured to: (a) receive a component information set of at least one external component; and (b) determine a mode of operation, by a device having a current mode of operation setting, based on the received component information and at least one of: an initial mode of operation setting and the current mode of operation setting. In some embodiments, the processing unit of the computing device may be further configured to: (c) determine whether all of the one or more received component information sets match a configuration requirement; (d) transition to a flight-ready status if the determination is a conjunctive match; and (e) transition to a reset status if the determination is not a conjunctive match.

Some embodiments may include a system comprising: (a) a processing unit and addressable member; the processing unit configured to: (i) receive a component information set of at least one system component; and (ii) determine a mode of operation, by the processing unit having a current mode of operation setting, based on the received component information and at least one of: an initial mode of operation setting and the current mode of operation setting; and (b) at least one sensor configured to detect the at least one system component. Some system embodiments may further comprise a system component associated with the component information set. Some system embodiments may further comprise a data store comprised of one or more parameters associated with the component information set.

In addition, embodiments may include processor-readable non-transient medium having processor executable instructions thereon, which when executed by a processor cause the processor to: (a) receive a component information set of at least one external component; (b) determine a mode of operation, by the processor having a current mode of operation setting, based on the received component information and at least one of: an initial mode of operation setting and the current mode of operation setting; (c) determine whether all of the one or more received component information sets match a configuration requirement; (d) transition to a flight-ready status if the determination is a conjunctive match; and (e) transition to a reset status if the determination is not a conjunctive match.

BRIEF DESCRIPTION OF THE DRAWINGS

Embodiments are illustrated by way of example and not limitation in the figures of the accompanying drawings, and in which:

FIG. 5 is a top view of another exemplary air vehicle embodiment of the present invention;

FIG. 6 is a top view of another exemplary air vehicle embodiment of the present invention;

FIG. 7 is a top view of another exemplary air vehicle embodiment of the present invention;

DETAILED DESCRIPTION

Figure 1A:
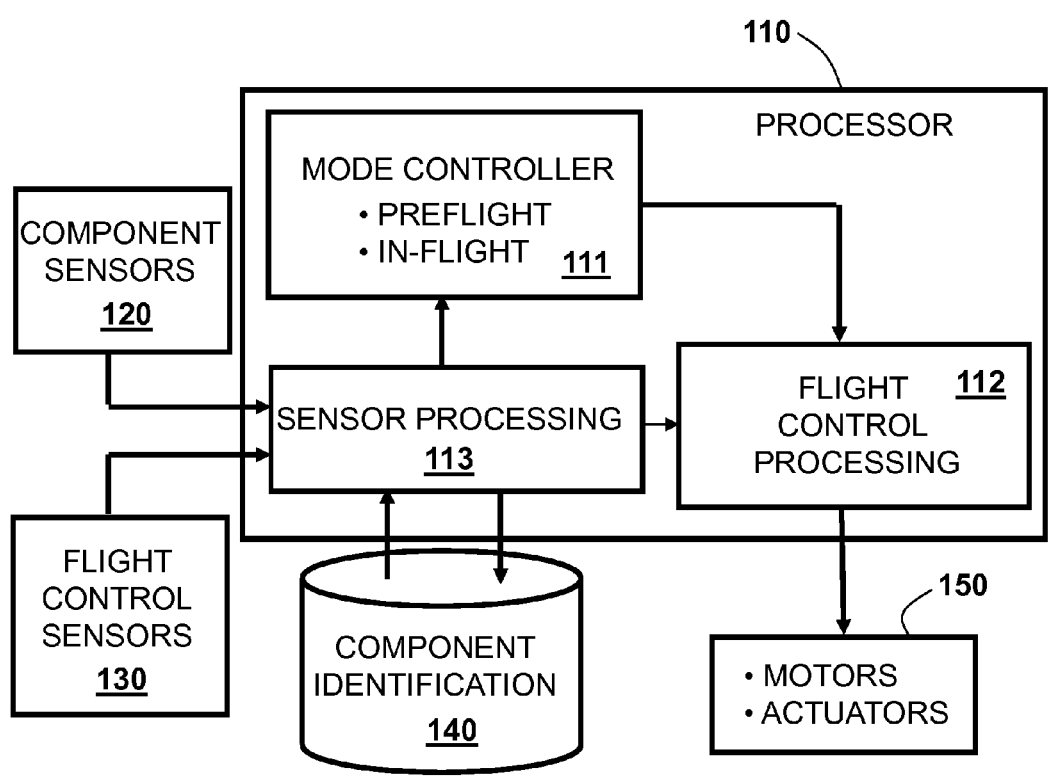
FIG. 1A is a top level functional block diagram of an embodiment of the present invention.

Reference is made to the drawings that illustrate exemplary embodiments. FIG. 1A is a top level functional block diagram of an embodiment of the present invention where a processing device or processor 110 may comprise one or more central processing units (CPUs) and addressable memory. The processor 110 may be comprised of functional modules of executable instructions and/or firmware modules. The processor 110 may be configured to execute instructions to perform mode control, flight control, and/or sensor processing/filtering. A mode controller 111 for an air vehicle may set or change parameters, filters, and control loop feedback gains according to the in-flight mode setting. The mode controller 111 for an air vehicle may test for the presence of external components according to a preflight mode setting. The mode controller 111 for an air vehicle may determine whether to change modes based on tests for values of metrics representative of flight conditions and/or the values of other flight parameters. A flight controller 112 for an air vehicle may receive sensed vehicle dynamics, sensed and/or estimated vehicle positions and/or velocities, and heading and/or attitude commands. The flight controller 112 may output commands to motors 150, e.g., propeller motors, and actuators, e.g., control surface actuators. The sensor processor 113 may receive output from vehicle dynamic sensors such as accelerometers and/or gyroscopes referenced by flight control sensors 130. The sensor processor 113 may receive output from component sensors 120 that may be indicative of the presence or the component. The sensor processor 113 may filter or otherwise condition the input from the flight control sensors 130 before providing the filtered and/or processed information to the flight control processing 112. Embodiments may include navigation processing that may be executed by sensor processing 113, flight control processing 112, or distributed between the two processing modules of the processor 110. The component sensor 120 output may comprise information that the sensor processing 113 may use as an index in referencing a component information database. Exemplary component sensors include radio frequency identification (rfid), inductance/Hall effect sensors, or voltage sensors. For example, in some embodiments, the external component may draw power from the vehicle and superimpose information on the voltage signal path.

Depending on the function of the processor 110, other modules, including functions and capabilities, may be added or removed. Furthermore, the modules in the exemplary processor 110 described herein may be further subdivided and combined with other functions so long as the function and processes described herein may be performed. The various modules may also be implemented in hardware, or a combination of hardware and software, i.e., firmware.

For an air vehicle embodiment, the external components may include a lifting surface extension, a tail boom, a rotor, a battery module, and a payload module. If the external component is a lifting surface extension, the information provided by an associated component sensor may be an index with the sensor processor 113 that may access a component identification database 140 comprising information indexed for: (a) airfoils such as span, chord, sweep, symmetry characteristics, and material; and (b) payloads such as auxiliary battery type.

Figure 1B:
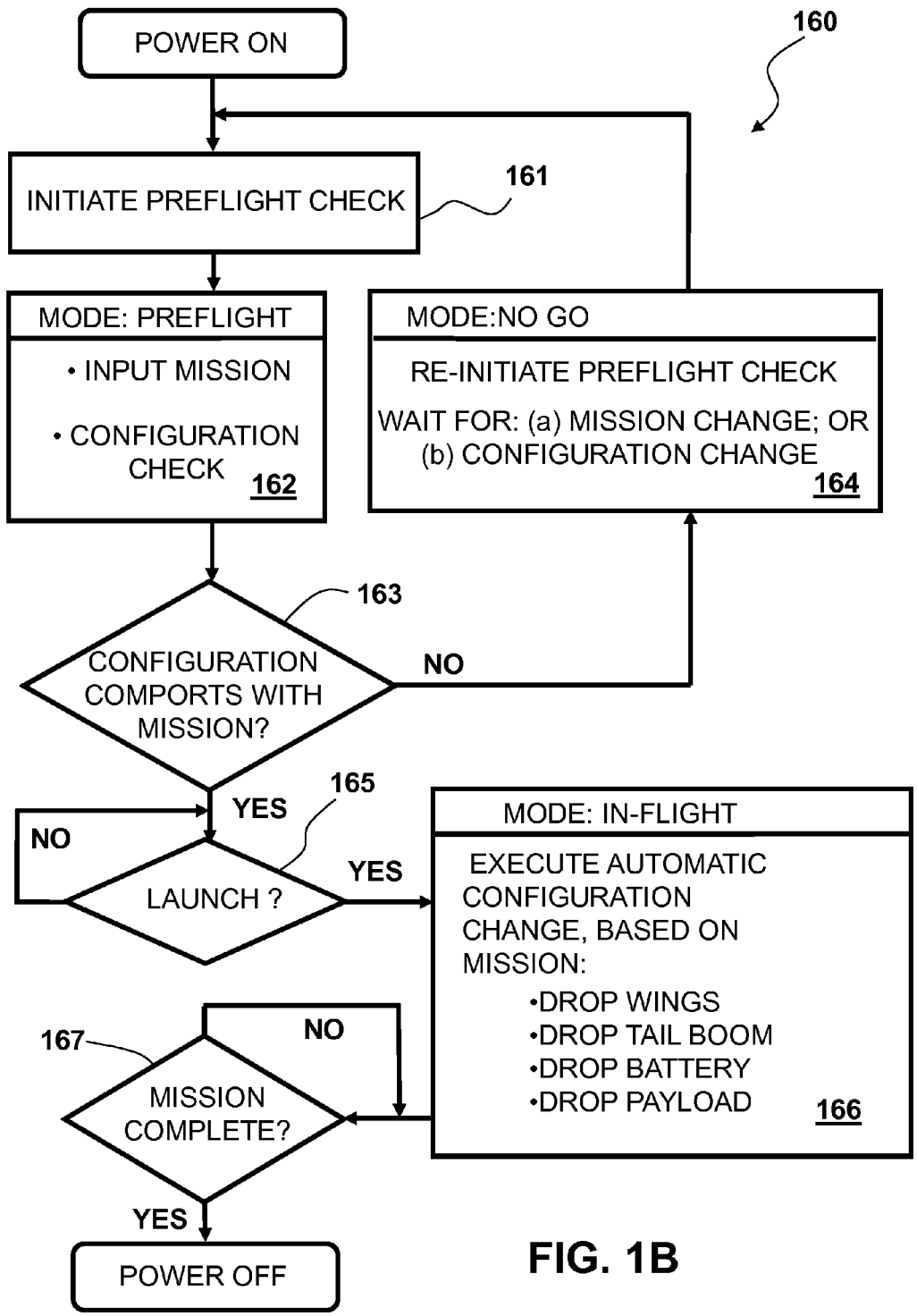
FIG. 1B is a top level mode logic flowchart of an embodiment of the present invention.

FIG. 1B is a top level mode logic flowchart 160 of an embodiment of the present invention where, after "power on," the processor receives an input to initiate a preflight check (step 161). In a preflight mode, the processing may input a mission setting and/or execute a configuration check (step 162). A mission setting may comprise: pre-launch configuration parameters, in-flight configuration parameters, one or more waypoints, a target point, and reconnaissance and/or surveillance trajectory parameters. A configuration check is a configuration determination that may comprise additional steps of receiving component sensor inputs, referencing component information databases, and/or comparing component sensor inputs with pre-launch configuration parameters based on a selected mission setting. If the determined configuration comports with the pre-launch configuration parameters that are based on a selected mission setting (test 163), then the system may transition to a launch-ready mode (test 165). If the determined configuration does not comport with the pre-launch configuration parameters that are based on a selected mission setting (test 163), then the system may transition to a "no go" mode (step 164). Optionally, the operator may invoke an override of the "no go" mode to force a launch. An operator and/or the processor re-initiate a preflight check and/or the sensed changing of components may trigger a configuration check and/or a change in mission setting may trigger a configuration check. In an in-flight mode (step 166), the processing may execute instructions to change configuration based on one or more mission parameters. The in-flight processing, e.g., a portion of the flight control processing 112 (FIG. 1A), may output to an associated actuated element such as a pin, level, screw, bolt, or the like, to effect a command to: drop wings, drop tail boom, drop an auxiliary, e.g., payload-stowed, battery, or some other payload component. Once the mission is completed (test 167), the processor may power off the processor 110, or in some embodiments may command a self-destruction component once the mission is completed or if the mission is determined to be irretrievably aborted.

Figure 2:
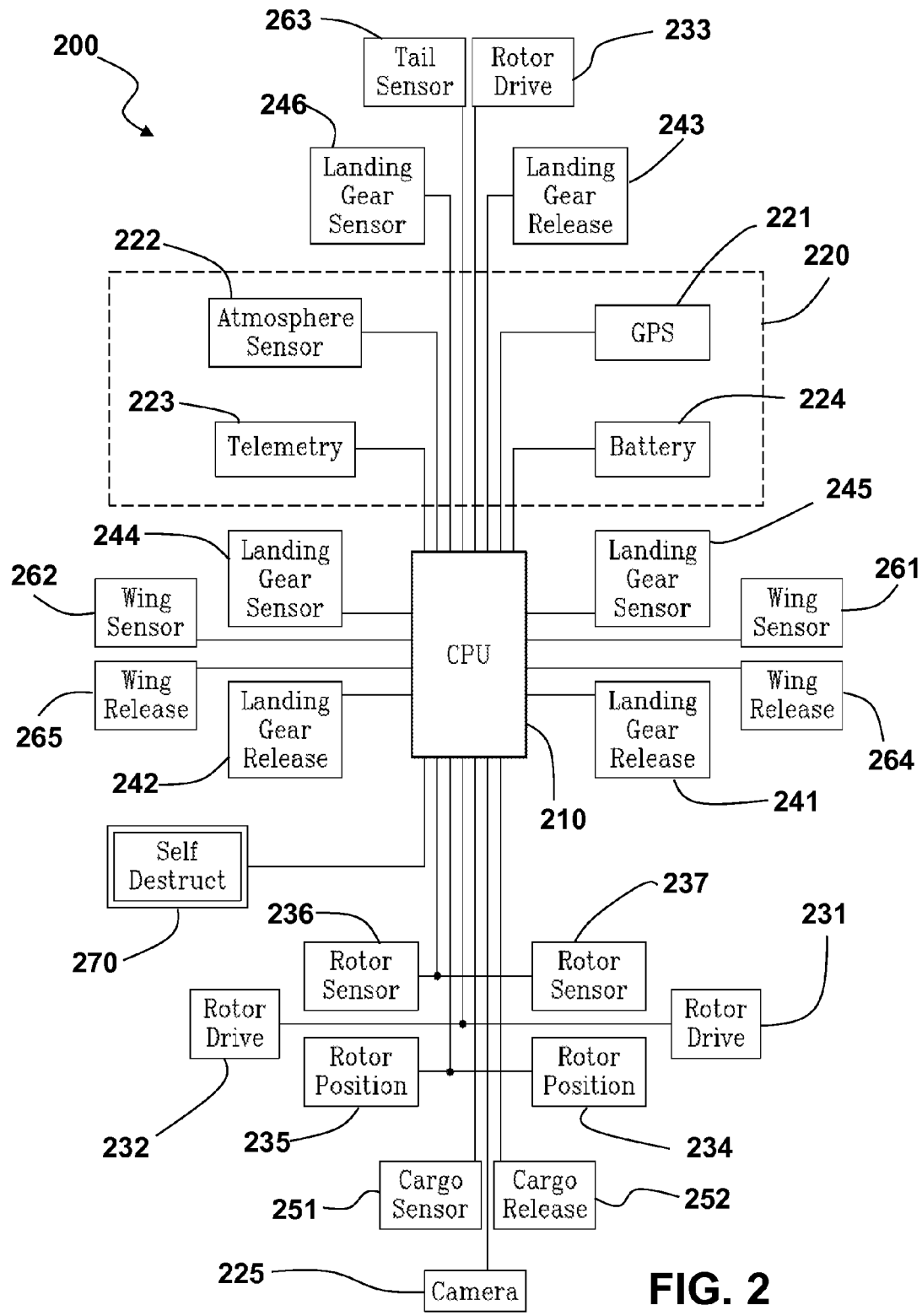
FIG. 2 is a top level functional block diagram of an embodiment of the present invention.

FIG. 2 is a top level functional block diagram of an embodiment of the present invention for an air vehicle where the system 200 is comprised of a CPU 210, flight control components 220 comprising a Global Positioning System (GPS) sensor and processing 221; an atmospheric pressure sensor 222, a power supply including a battery 224, and a telemetry 223 that may include an uplink receiver and processor. The flight control components may also include an inertial measurement unit and/or accelerometers and/or gyroscopic sensors. The system 200 may further include an image sensor such as camera 225. The system 200 may further comprise a forward port/left rotor drive 231, a forward starboard/right rotor drive 232, an aft rotor drive 233, a forward port/left rotor tilt 234, a forward starboard/right rotor tilt 235, a forward starboard/right rotor guard sensor 236, and a forward port/left rotor guard sensor 237. The system may comprise landing gear and mission settings may require the landing gear be extended or released from a stowed position and/or may require the landing gear be dropped from the system. Accordingly, the system 200 may further comprise a forward port/left landing gear release actuator 241, a forward starboard/right landing gear release actuator 242, an aft landing gear release actuator 243, a forward starboard/right landing gear sensor 244, a forward port/left landing gear sensor 245, and an aft landing gear sensor 246. The system 200 may comprise a payload or cargo sensor 251 and may further comprise a payload or cargo release actuator 252. The system 200 may further comprise a forward port/left wing sensor 261, a forward starboard/right wing sensor 262, a tail or tail boom sensor 263, a tail boom release actuator (not shown), a forward port/left wing release actuator 264, and a forward starboard/right wing release actuator 265. The system 200 may further include self-destruct safe/arm circuitry 270. The communication channels may be wired and/or wireless, e.g., radio frequency and/or infrared. The wired communication channels may include metal wire channels having protocols including IEEE 1553, Ethernet, and the universal serial bus (USB), and fiber optic channels.

Figure 3:
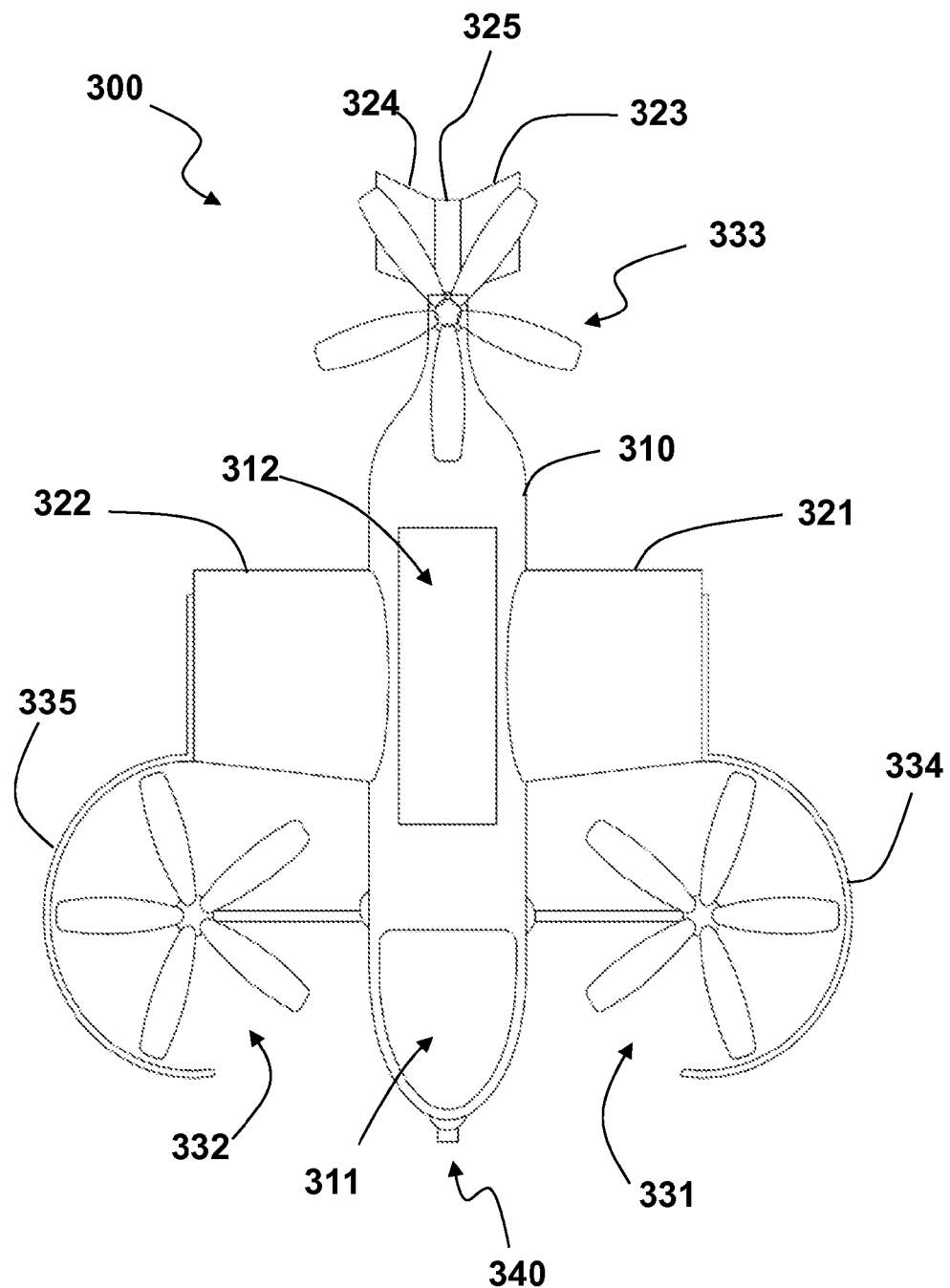
FIG. 3 is a top view of an exemplary air vehicle embodiment of the present invention.

FIG. 3 is a top view of an exemplary air vehicle embodiment 300 of the present invention comprising a fuselage 310 comprising: a forward volume 311 for disposing device electronics, circuitry and processing, an auxiliary battery, and/or a primary payload; and a mid-body volume 312 for disposing device electronics, circuitry and processing, a power supply, and/or an auxiliary payload. The vehicle 300 may further comprise a port/left wing base 321 and a starboard/right wing base 322 and each of these airfoils 321, 322, or portions thereof, may be actuated as elevators, ailerons, or elevons. The vehicle may further comprise a port/left tail airfoil 323 and a starboard/right tail airfoil 324 where each of these airfoils 323, 324 may be disposed on a vertical tail 325, and each of these airfoils 323, 324, or portions thereof, may comprise an inverted v-tail and may be actuated as ruddervators. The air vehicle 300 may further comprise a port/left rotor 331, a starboard/right rotor 332, an aft rotor 333, a port/left rotor guard 334 detachably attached to the port/left wing base 321, a starboard/right rotor guard 335 detachably attached to the starboard/right wing base 335. The air vehicle 300 may further comprise a body-fixed image sensor, e.g., a camera 340, disposed on the air vehicle nose. The nose location may further include a pitot tube.

Figure 4:
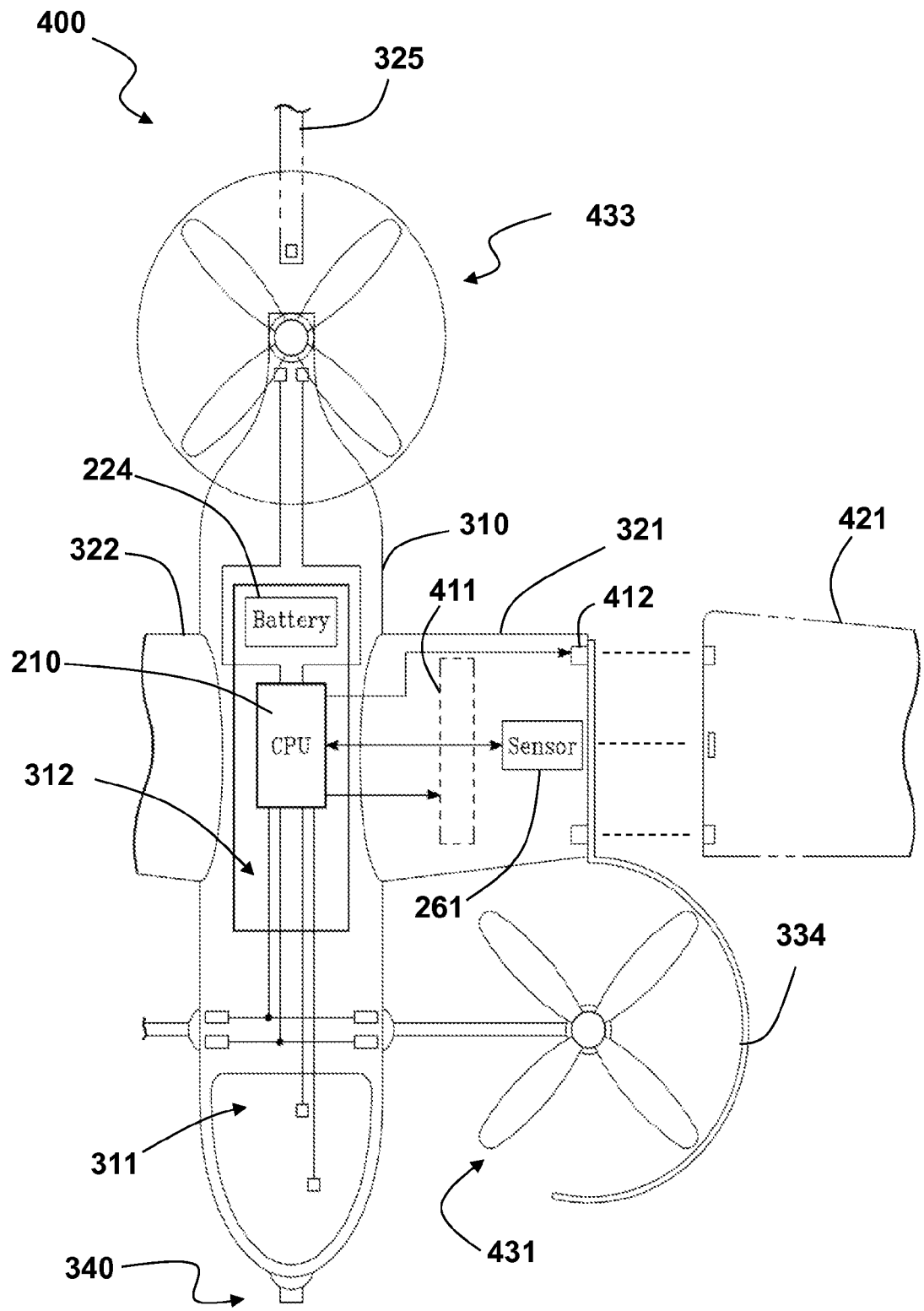
FIG. 4 is a partial cutaway top view of an exemplary air vehicle embodiment of the present invention.

FIG. 4 is a partial cutaway top view of an exemplary air vehicle embodiment 400 of the present invention depicting an exemplary disposition of the CPU 210 and the battery 224 in the mid-body volume 312. The vertical tail 325 is depicted as detached from the fuselage 310 and a port/left external wing component 421 is shown proximate to the port/left wing base 321. The port/left wing base 321 is depicted in this example as further comprising a wing sensor 261, an actuator volume 411 for receiving power where a landing gear release actuator may be disposed, and a connector 412 that may connect voltage or signal output from the CPU to one or more devices that may be disposed on the port/left external wing component 421. In this example, the port/left rotor 431 and aft rotor 433 are shown as four-blade rotors. While each rotor of the several examples comprises a plurality of blades, the teachings of the description apply to all rotor embodiments.

FIG. 5 is a top view of another exemplary air vehicle embodiment 500 of the present invention where the configuration is not flight worthy. For example, without either a v-shaped tail airfoil pair (e.g., ruddervator) tail boom or an aft rotor, a configuration check of the configuration as depicted in FIG. 5, if powered on, would return a "no-go." A configuration check may also require the port/left and starboard/right rotor guards be attached to their respective wing base in order for the configuration to comport with the configuration required for the mission setting.

FIG. 6 is a top view of another exemplary air vehicle embodiment 600 of the present invention where the port/left 334 and starboard/right 335 rotor guards may be attached to their respective wing base and both a vertical tail 325 and aft rotor 333 are attached. In this example, the tail boom may or may not also include v-shaped tail airfoil pair 324, 323 (FIG. 3), or ruddervator, in order to comport with a mission setting. Accordingly, a configuration check may be passed and the vehicle may be placed into a ready for launch mode.

FIG. 7 is a top view of another exemplary air vehicle embodiment 700 of the present invention where a port/left external wing component 711 is attached to the port/left wing base 321 and a starboard/right external wing component 712 is attached to the starboard/right wing base 322. In this example, the vertical tail 325 may also include a v-shaped tail airfoil pair 324, 323 (FIG. 3), in order to comport with a mission setting.

Figure 8:
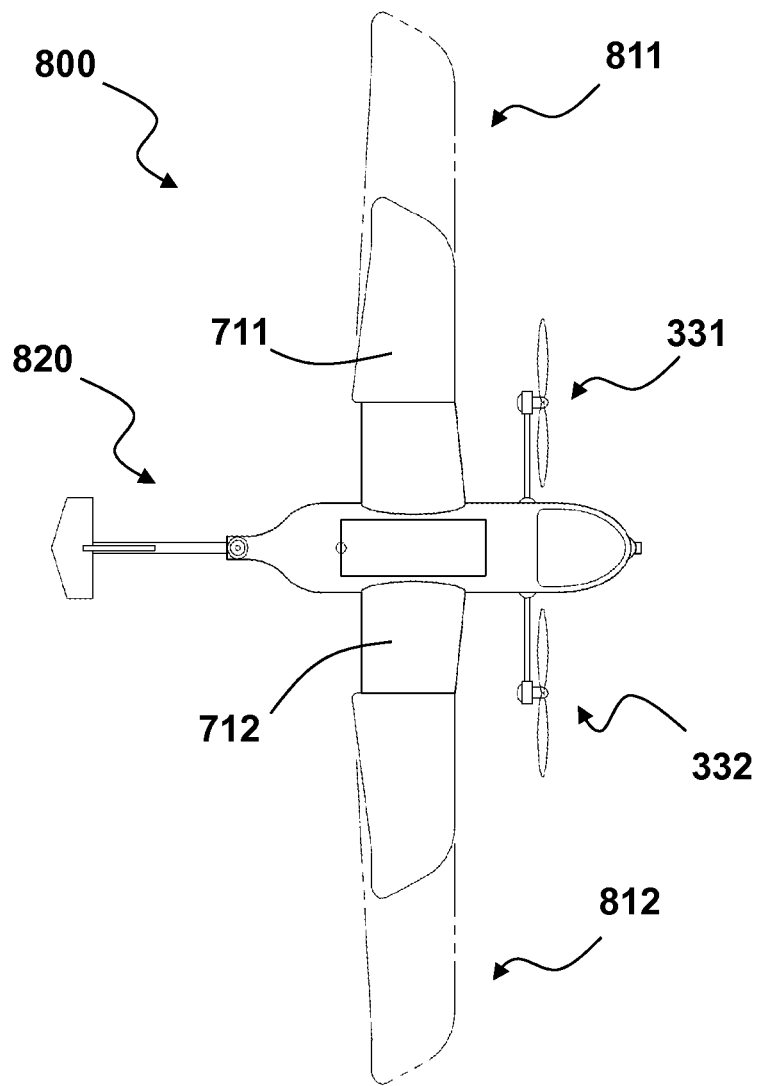
FIG. 8 is a top view of another exemplary air vehicle embodiment of the present invention.
Figure 9:
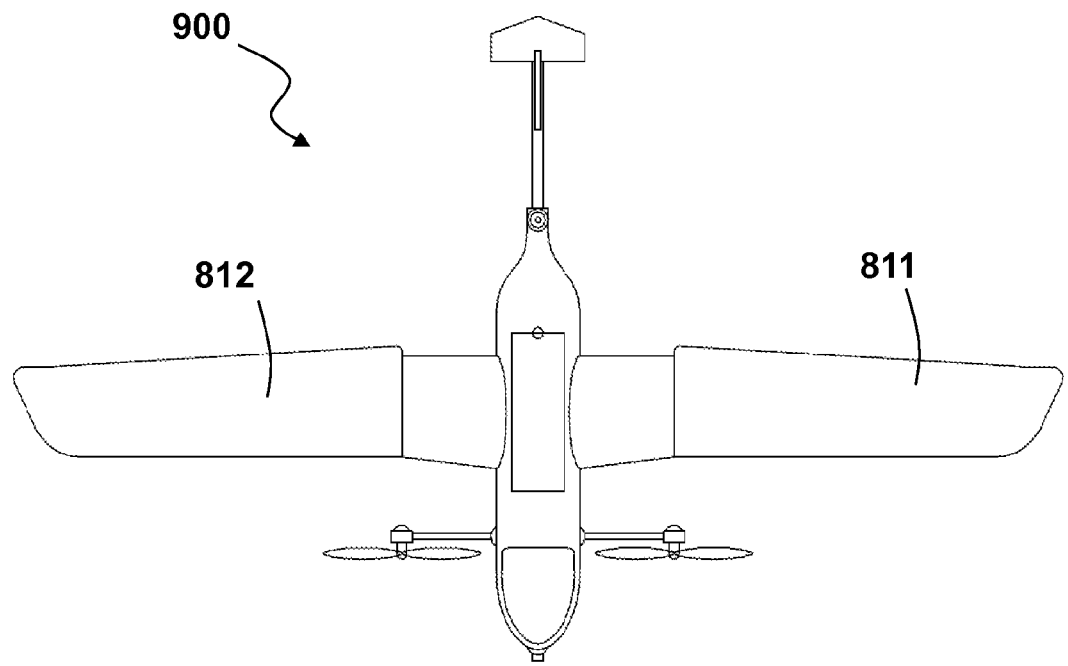
FIG. 9 is a top view of another exemplary air vehicle embodiment of the present invention.
Figure 10:
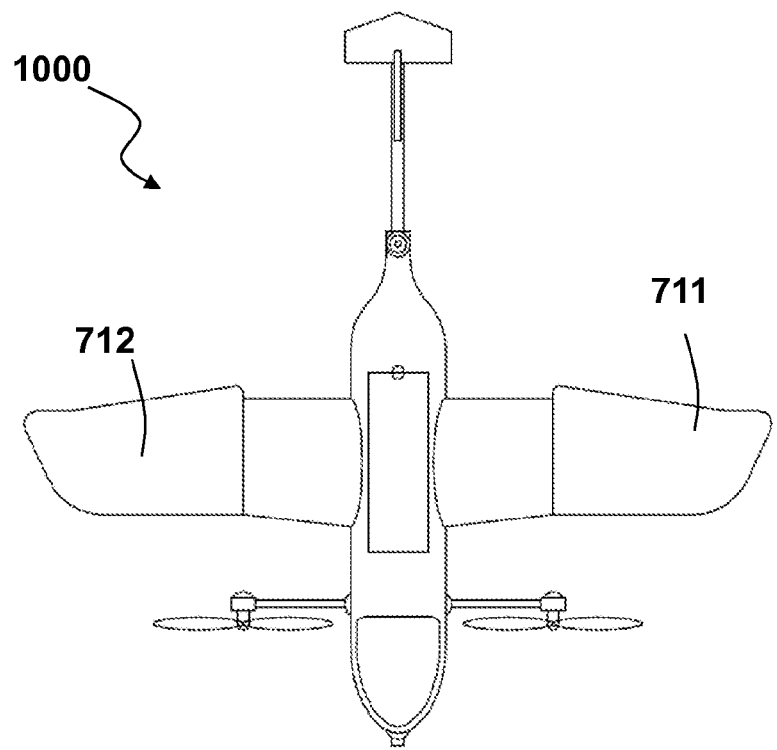
FIG. 10 is a top view of another exemplary air vehicle embodiment of the present invention.

FIG. 8 is a top view of another exemplary air vehicle embodiment 800 of the present invention where the wingspan of the vehicle may be changed in the preflight mode by replacing, in this example, a port/left external wing component 811 with one of less span 711 and replacing starboard/right external wing component 812 with one of less span 712. FIG. 8 also depict the air vehicle embodiment 800 comprising a tail boom 820. In addition, the forward rotors 331, 332 may be commanded to a forward position as shown prior to launch responsive to a mission setting. FIG. 9 is a top view of the exemplary air vehicle embodiment 900 having the longer span and FIG. 10 is a top view the exemplary air vehicle embodiment 1000 having the shorter span previously mentioned.

Figure 11:
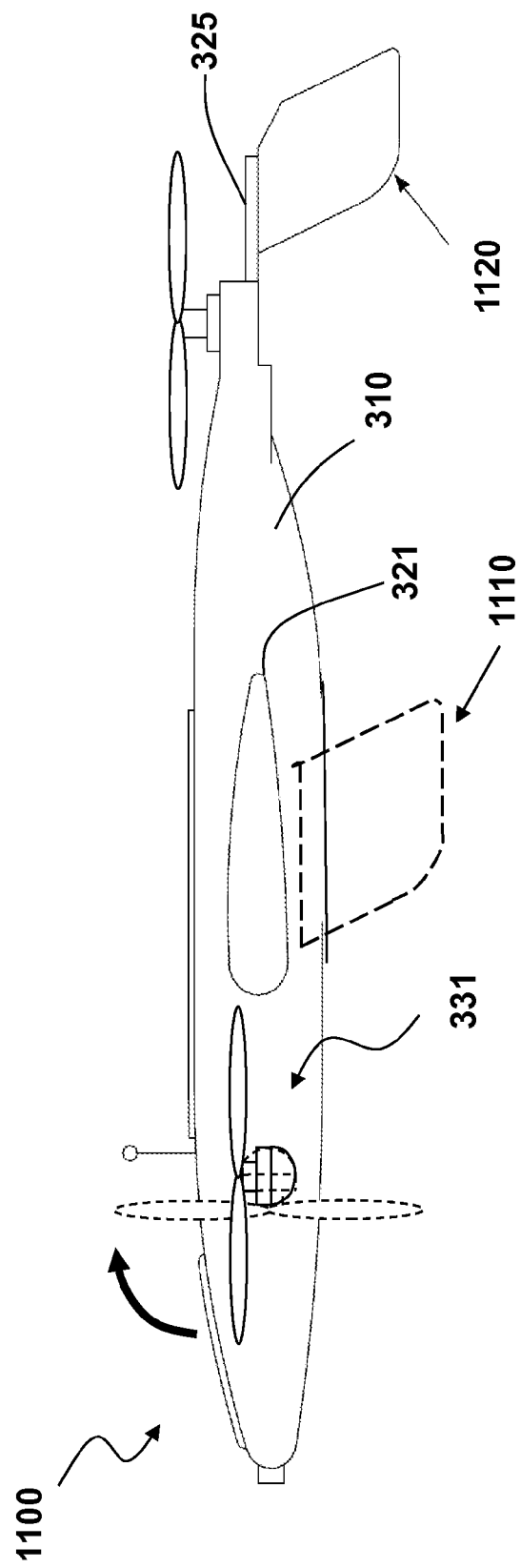
FIG. 11 is a side view of another exemplary air vehicle embodiment of the present invention.

FIG. 11 is a side view of another exemplary air vehicle embodiment 1100 of the present invention where the port rotor may be tilted before launch, during flight, and during landing so as to clear the landing surface at touchdown. In the forward position, the rotor functions as a propeller. An optional surface may extend from the port/left wing base 321 or, as depicted 1110, from a portion of the fuselage 310. An optional surface 1120 may extend from a vertical tail 325. These exemplary surfaces may provide lift when the vehicle is traveling in the direction of the longitudinal axis of the vehicle, and these exemplary surfaces may provide structural support to the vehicle, when landed, and accordingly may be sized to accommodate forward propeller/rotor clearance.

It is contemplated that various combinations and/or sub-combinations of the specific features and aspects of the above embodiments may be made and still fall within the scope of the invention. Accordingly, it should be understood that various features and aspects of the disclosed embodiments may be combined with or substituted for one another in order to form varying modes of the disclosed invention. Further it is intended that the scope of the present invention herein disclosed by way of examples should not be limited by the particular disclosed embodiments described above.

What is claimed is:

1. A method operational mode determination comprising:
   detecting, by a processing unit, the presence of at least one detachably attached external component, wherein the at least one detachably attached external component is at least one of: a lifting surface extension, a tail boom, and a rotor;
   receiving, by the processing unit, a component information set from each of the detected at least one detachably attached external components; and
   determining a mode of operation, by the processing unit, based on the received at least one component information set.

2. The method of claim 1 further comprising:
   determining whether all of the one or more received component information sets match a configuration requirement;
   transitioning to a flight-ready status if the determination is a conjunctive match; and
   transitioning to a reset status if the determination is not a conjunctive match.

3. A computing device comprising:
   a processing unit and addressable member; the processing unit configured to:
   detect the presence of at least one detachably attached external component, wherein the at least one detachably attached external component is at least one of: a lifting surface extension, a tail boom, and a rotor;
   receive a component information set from each of the detected at least one detachably attached external components;
   reference the received component information set against a component information database; and
   determine a mode of operation based on the referenced received component information set.

4. The computing device of claim 3 wherein the processing unit is further configured to:
   determine whether all of the one or more received component information sets match a configuration requirement;
   transition to a flight-ready status if the determination is a conjunctive match; and
   transition to a reset status if the determination is not a conjunctive match.

5. A system comprising:
a processing unit and addressable member; the processing unit configured to:
- detect, by at least one sensor, the presence of at least one detachably attached system component, wherein the at least one detachably attached system component is at least one of: a lifting surface extension, a tail boom, and a rotor;
- receive a component information set from each of the detected at least one detachably attached system components, wherein the component information set includes database index information; and
- determine a mode of operation, based on the received component information set.

6. The system of claim 5 wherein the processing unit is further configured to:
- release, via an actuated element, at least one detected detachably attached system component.

7. The system of claim 5 further comprising a data store comprised of one or more parameters associated with the component information set.

8. An air vehicle comprising:
a processing unit and addressable member; the processing unit configured to:
- detect, by a means for detecting at least one sensor, the presence of at least one detachably attached system component, wherein the at least one detachably attached system component is at least one of: a lifting surface extension, a tail boom, and a rotor;
- receive a component information set from each of the detected at least one detachably attached system components; and
- determine a mode of operation based on the received at least one component information set.

9. The air vehicle of claim 8 wherein the lifting surface extension is a portion of a wing.

10. The air vehicle of claim 8 wherein the processing unit is further configured to:
- release, via an actuated element, at least one detected detachably attached system component.

11. A processor readable non-transient medium having processor executable instructions thereon, which when executed by a processor cause the processor to:
- detect the presence of at least one detachably attached external component, wherein the at least one detachably attached external component is at least one of: a lifting surface extension, a tail boom, and a rotor;
- receive a component information set from each of the detected at least one detachably attached external components, wherein the component information set includes information associated with a database;
- determine a mode of operation based on the received at least one component information set;
- determine whether all of the one or more received component information sets match a configuration requirement;
- transition to a flight-ready status if the determination is a conjunctive match; and
- transition to a reset status if the determination is not a conjunctive match.

* * * * *